(12) United States Patent
Yoshimoto (10) Patent No.: US 9,838,566 B2
(45) Date of Patent: Dec. 5, 2017

(54) IMAGE FORMING APPARATUS AND IMAGE FORMING METHOD CAPABLE OF SEARCHING PRINT REPORT FOR CHANGED INFORMATION

(71) Applicant: KYOCERA Document Solutions Inc., Osaka-shi, Osaka (JP)

(72) Inventor: Yusuke Yoshimoto, Osaka (JP)

(73) Assignee: KYOCERA Document Solutions Inc., Osaka-shi, Osaka (JP)

( * ) Notice: Subject to any disclaimer, the term of this patent is extended or adjusted under 35 U.S.C. 154(b) by 28 days.

(21) Appl. No.: 14/924,492

(22) Filed: Oct. 27, 2015

(65) Prior Publication Data

US 2016/0125277 A1 May 5, 2016

(30) Foreign Application Priority Data

Oct. 31, 2014 (JP) ................. 2014-222679

(51) Int. Cl.
*H04N 1/38* (2006.01)
*H04N 1/00* (2006.01)
*G06K 15/00* (2006.01)

(52) U.S. Cl.
CPC .............. *H04N 1/38* (2013.01); *G06K 15/40* (2013.01); *H04N 1/00188* (2013.01); *H04N 1/00925* (2013.01); *H04N 1/00954* (2013.01); *H04N 2201/0082* (2013.01); *H04N 2201/0094* (2013.01)

(58) Field of Classification Search
CPC ............. H04N 1/0044; H04N 1/00161; H04N 1/00188; G06F 3/1256
See application file for complete search history.

(56) References Cited

U.S. PATENT DOCUMENTS 8,386,504 B1 * 2/2013 Wood ................ G06F 17/30595
707/758
2007/0146791 A1 * 6/2007 Murase .................. H04N 1/387
358/1.16

(Continued)

FOREIGN PATENT DOCUMENTS

JP 2001341365 A 12/2001
JP 2007006212 A 1/2007

(Continued)

*Primary Examiner* — Nicholas Pachol
(74) *Attorney, Agent, or Firm* — Alleman Hall Creasman & Tuttle LLP (57) ABSTRACT

In an image forming apparatus: a report reading portion reads image data of a print report that has already been printed; a memory stores report data of a current time point; a format determining portion determines whether or not the read print report and the report data match in format; a change search portion, when the print report and the report data match in format, determines whether or not changed information is included in the report data by comparing the report data with the print report for each item, the changed information being information that has been changed from corresponding information in the print report; and a change output portion, when the changed information is included in the report data, re-prints the changed information in a vicinity of pre-change information on the print report, the pre-change information corresponding to the changed information.

2 Claims, 9 Drawing Sheets (56) References Cited

U.S. PATENT DOCUMENTS

| | | | |
|---|---|---|---|
| 2008/0151299 A1* | 6/2008 | Takahata | H04N 1/32 358/1.15 |
| 2009/0207454 A1* | 8/2009 | Ikari | H04N 1/00326 358/3.24 |
| 2009/0279116 A1* | 11/2009 | Nishio | G06K 9/2081 358/1.13 |
| 2010/0309518 A1* | 12/2010 | Ito | H04N 1/00222 358/1.15 |
| 2011/0002014 A1* | 1/2011 | Tani | H04N 1/00244 358/403 |
| 2012/0047225 A1* | 2/2012 | Kunitake | G06Q 10/10 709/217 |
| 2013/0321874 A1* | 12/2013 | Kaneko | G06K 15/005 358/3.28 |
| 2014/0293353 A1* | 10/2014 | Nagata | H04N 1/32101 358/1.15 |

FOREIGN PATENT DOCUMENTS

| | | |
|---|---|---|
| JP | 2007168382 A | 7/2007 |
| JP | 2009093410 A | 4/2009 |

* cited by examiner

```
Network
LAN Interface
  Setting:              Auto
  Current:              100BASE-TX Full
TCP/IP
  Status:               Enabled
  Printer Host Name:    KM5D0213
IPv4
  DHCPv4 Status:        Enabled
  Bonjour Status:       Enabled
  IP Address:           10.183.53.13
  Subnet Mask:          255.255.24.0
  Default Gateway:      10.183.48.252
IPv6
  Status:               Enabled
  DHCPv6 Status:        Enabled
  RA Status:            Enabled
  Manual :
  DHCPv6(Stateful):     3ffe:501:811:ff02:0:8ff:fe8b:3090/64
  RA(Stateless):        3ffe:501:811::fe8b:3090/64

3ffe:501:811:ff02:0:8ff:fe81:3090/64
                        3ffe:501:811:ff02:0:8ff:fe81:3091/64
                        3ffe:501:811:ff02:0:8ff:fe81:3092/64
                        3ffe:501:811:ff02:0:8ff:fe81:3093/64
                        3ffe:501:811:ff02:0:8ff:fe81:3094/64
  LinkLocal:            FE80:1111:2222:3333:4444:5555:6666:7777/64
```

```
Network
LAN Interface
  Setting:              Auto
  Current:              100BASE-TX Full
TCP/IP
  Status:               Enabled
  Printer Host Name:    KM5D0213
IPv4
  DHCPv4 Status:        Enabled
  Bonjour Status:       Enabled
  IP Address:           10.183.53.13
  Subnet Mask:          255.255.24.0
  Default Gateway:      10.183.48.113     ← CHANGED PART
IPv6
  Status:               Enabled
  DHCPv6 Status:        Enabled
  RA Status:            Enabled
  Manual :
  DHCPv6(Stateful):     3ffe:501:811:ff02:0:8ff:fe8b:3090/64
  RA(Stateless):        3ffe:501:811::fe8b:3090/64

3ffe:501:811:ff02:0:8ff:fe81:3090/64
                        3ffe:501:811:ff02:0:8ff:fe81:3091/64
                        3ffe:501:811:ff02:0:8ff:fe81:3092/64
                        3ffe:501:811:ff02:0:8ff:fe81:3093/64
                        3ffe:501:811:ff02:0:8ff:fe81:3094/64
  LinkLocal:            FE80:1111:2222:3333:4444:5555:6666:7777/64
```

FIG.5B

Network
LAN Interface
 Setting: Auto
 Current: 100BASE-TX Full
TCP/IP
 Status: Enabled
 Printer Host Name: KM5D0213
IPv4
 DHCPv4 Status: Enabled
 Bonjour Status: Enabled
 IP Address: 10.183.53.13
 Subnet Mask: 255.255.24.0
 Default Gateway: 10.183.48.252
IPv6
 Status: Enabled
 DHCPv6 Status: Enabled
 RA Status: Enabled
 Manual : 3ffe:501:811:ff02:0:8ff:fe8b:3090/64
 DHCPv6(Stateful): 3ffe:501:811::fe8b:3090/64
 RA(Stateless): 3ffe:501:811:ff02:0:8ff:fe81:3090/64
  3ffe:501:811:ff02:0:8ff:fe81:3091/64
  3ffe:501:811:ff02:0:8ff:fe81:3092/64
  3ffe:501:811:ff02:0:8ff:fe81:3093/64
  3ffe:501:811:ff02:0:8ff:fe81:3094/64
LinkLocal: FE80:1111:2222:3333:4444:5555:6666:7777/64

Network
LAN Interface
  Setting:              Auto
  Current:              100BASE-TX Full
TCP/IP
  Status:               Enabled
  Printer Host Name:    KM5D0213
IPv4
  DHCPv4 Status:        Enabled
  Bonjour Status:       Enabled
  IP Address:           10.183.53.13
  Subnet Mask:          255.255.24.0
  Default Gateway:      ~~10.183.48.252~~ ← 606  10.183.48.113 ← 605
IPv6
  Status:               Enabled
  DHCPv6 Status:        Enabled
  RA Status:            Enabled
  Manual :
  DHCPv6(Stateful):     3ffe:501:811:ff02:0:8ff:fe8b:3090/64
  RA(Stateless):        3ffe:501:811::fe8b:3090/64

3ffe:501:811:ff02:0:8ff:fe81:3090/64
                        3ffe:501:811:ff02:0:8ff:fe81:3091/64
                        3ffe:501:811:ff02:0:8ff:fe81:3092/64
                        3ffe:501:811:ff02:0:8ff:fe81:3093/64
                        3ffe:501:811:ff02:0:8ff:fe81:3094/64
  LinkLocal:            FE80:1111:2222:3333:4444:5555:6666:7777/64

Network
LAN Interface
  Setting:              Auto
  Current:              100BASE-TX Full
TCP/IP
  Status:               Enabled
  Printer Host Name:    KM5D0213
IPv4
  DHCPv4 Status:        Enabled
  Bonjour Status:       Enabled
  IP Address:           ~~10.183.53.13~~ ~~10.183.53.13~~ 10.183.53.123
  Subnet Mask:          255.255.24.0
  Default Gateway:      ~~10.183.48.252~~ ~~0.0.0.0~~ 10.183.53.123
IPv6
  Status:               Enabled  10.183.48.113
  DHCPv6 Status:        Enabled
  RA Status:            Enabled
  Manual :
  DHCPv6(Stateful):     3ffe:501:811:ff02:0:8ff:fe8b:3090/64
  RA(Stateless):        3ffe:501:811::fe8b:3090/64

3ffe:501:811:ff02:0:8ff:fe81:3090/64
                        3ffe:501:811:ff02:0:8ff:fe81:3091/64
                        3ffe:501:811:ff02:0:8ff:fe81:3092/64
                        3ffe:501:811:ff02:0:8ff:fe81:3093/64
                        3ffe:501:811:ff02:0:8ff:fe81:3094/64
  LinkLocal:            FE80:1111:2222:3333:4444:5555:6666:7777/64

IMAGE FORMING APPARATUS AND IMAGE FORMING METHOD CAPABLE OF SEARCHING PRINT REPORT FOR CHANGED INFORMATION

INCORPORATION BY REFERENCE

This application is based upon and claims the benefit of priority from the corresponding Japanese Patent Application No. 2014-222679 filed on Oct. 31, 2014, the entire contents of which are incorporated herein by reference.

BACKGROUND

The present disclosure relates to an image forming apparatus and an image forming method.

Conventionally, an image forming apparatus such as a copier, a multifunction peripheral, or a printer includes a report printing function. The report printing function is a function to output status information onto paper sheets. The status information includes network information of the image forming apparatus, and counter information indicating the number of printed paper sheets. A report printing that is executed by the report printing function of the image forming apparatus, is executed in a predetermined format for a predetermined item. As a result, when the report printing is performed repeatedly, a large amount of paper sheets and toner are consumed.

A typical image forming apparatus compares data before change with data after change in units of pages, and prints only pages that have been changed. This makes it possible to reduce the printing time and the number of sheets to be printed when a printing material with a plurality of pages is printed.

In addition, another typical image forming apparatus compares data before change with data after change for each area, and prints only parts that have different area information. This makes it possible to reduce the printing time and the number of printed sheets. Furthermore, this image forming apparatus prints an image indicating elimination on the parts that have been changed such that the changed parts are clearly indicated.

SUMMARY

An image forming apparatus according to an aspect of the present disclosure includes a report reading portion, a memory, a format determining portion, a change search portion, and a change output portion. The report reading portion reads image data of a print report that has already been printed. The memory stores report data of a current time point. The format determining portion determines whether or not the print report read by the report reading portion and the report data stored in the memory match in format. The change search portion, when the format determining portion determines that the print report and the report data match in format, determines whether or not changed information is included in the report data by comparing the report data with the print report for each item, the changed information being information that has been changed from corresponding information in the print report. The change output portion configured to, when the change search portion determines that the changed information is included in the report data, re-print the changed information in a vicinity of pre-change information on the print report, the pre-change information corresponding to the changed information.

An image forming method according to another aspect of the present disclosure includes a report reading step, a format determining step, a change search step, and a change output step. The report reading step reads image data of a print report that has already been printed. The format determining step determines whether or not the print report read in the report reading step and report data read from a memory that stores report data of a current time point, match in format. The change search step, when the format determining step determines that the print report and the report data match in format, determines whether or not changed information is included in the report data by comparing the report data with the print report for each item, the changed information being information that has been changed from corresponding information of the print report. The change output step, when the change search step determines that the changed information is included in the report data, re-prints the changed information in a vicinity of pre-change information on the print report, the pre-change information corresponding to the changed information.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

The following describes an embodiment of an image forming apparatus and an image forming method of the present disclosure, with reference to the drawings, for the understanding of the disclosure. It should be noted that the following embodiment is an example of a specific embodiment of the present disclosure and should not limit the technical scope of the present disclosure. It should also be noted that the alphabet "S", which is put before a numeral in the flowcharts, means "step".

The following explains a multifunction peripheral (MFP) 100 as an example of an embodiment of the image forming apparatus of the present disclosure. It is noted that the multifunction peripheral 100 is an apparatus that has functions of, for example, a facsimile, a copier, a scanner, and a printer.

Figure 1:
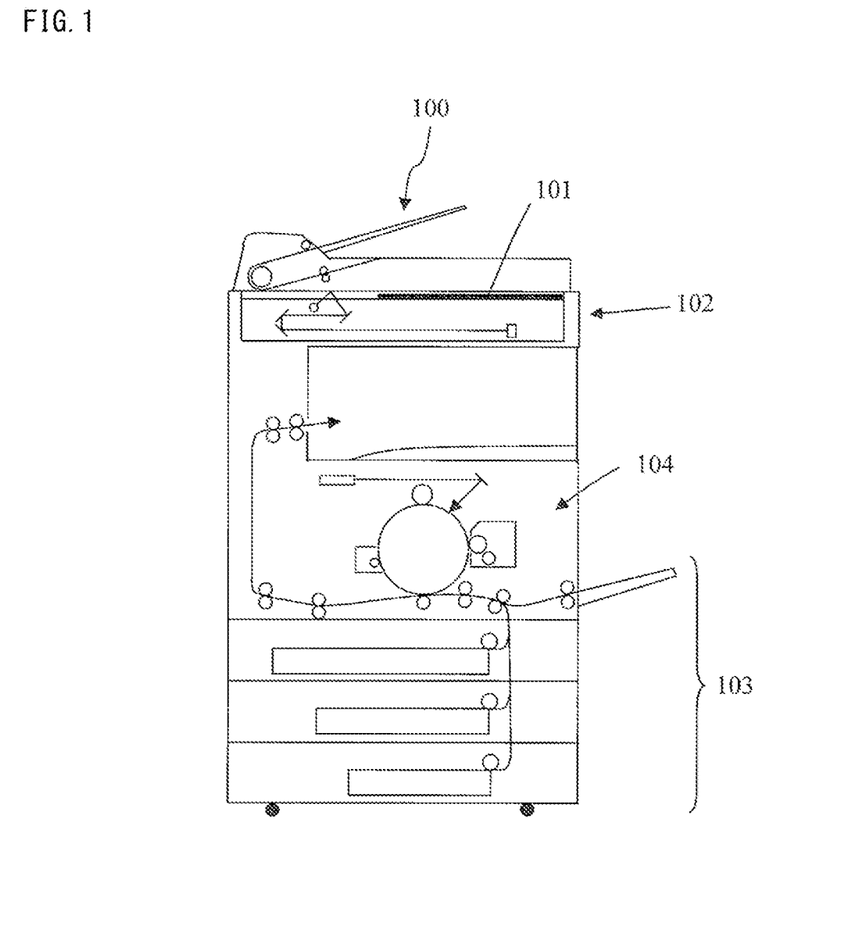
FIG. 1 shows a whole internal configuration of a multifunction peripheral according to an embodiment of the present disclosure.

As shown in FIG. 1, the multifunction peripheral 100 includes an operation portion 101, an image reading portion 102, a conveyance portion 103, and an image forming portion 104. Upon receiving setting conditions of a print job and an execution input of the print job from the user via the operation portion 101, the multifunction peripheral 100 drives the image reading portion 102, the conveyance portion 103, the image forming portion 104 and the like, and executes the print job. The operation portion 101 includes a touch panel through which to receive an instruction input from the user or which displays a screen. In addition, the image reading portion 102 reads image data from a document sheet placed on a document sheet table or an automatic document sheet feeding portion. Furthermore, the conveyance portion 103 conveys a paper sheet from a sheet feed cassette or a manual feed tray on which the paper sheet has been placed. The image forming portion executes an image formation by transferring a toner image corresponding to the image data to the paper sheet conveyed thereto, and fixing the toner image to the paper sheet.

It is noted that although not shown, the control circuit of the multifunction peripheral 100 is configured such that at least a CPU (Central Processing Unit), a ROM (Read Only Memory), a RAM (Random Access Memory), a HDD (Hard Disk Drive), and drivers for driving corresponding portions are connected by an internal bus.

As one example, the CPU of the multifunction peripheral 100 uses the RAM as a working area, executes programs stored in the ROM, the HDD or the like, receives data, instructions, signals, and commands from the drivers based on the execution results, and controls the operations of the portions related to the print job execution. In addition, a display receiving portion 201, a report output portion 202, a report reading portion 203, a format determining portion 204, a change search portion 205, and a change output portion 206 (see FIG. 2) other than the above-described portions are realized when the CPU executes the programs, wherein the portions 201-206 are described below. The ROM, the RAM, the HDD and/or the like store programs and data for realizing the portions 201-206 that are described below. Processes of the portions 201-206 are realized specifically when the CPU executes the programs by using the data.

Meanwhile, according to a typical conventional technology, comparison is made in units of pages, and thus, even when only one change has been made in a page, all items of the page are printed. As a result, a problem of the conventional technology is that the advantageous effect of reducing the printing time and/or the number of print sheets cannot be produced if the material to be printed has a small number of pages or has several changes in each of a plurality of pages. As described below, the multifunction peripheral 100 of the present disclosure improves the report printing in such a manner that the amount of consumed toner or paper sheets is reduced and changes can easily be found.

Figure 2:
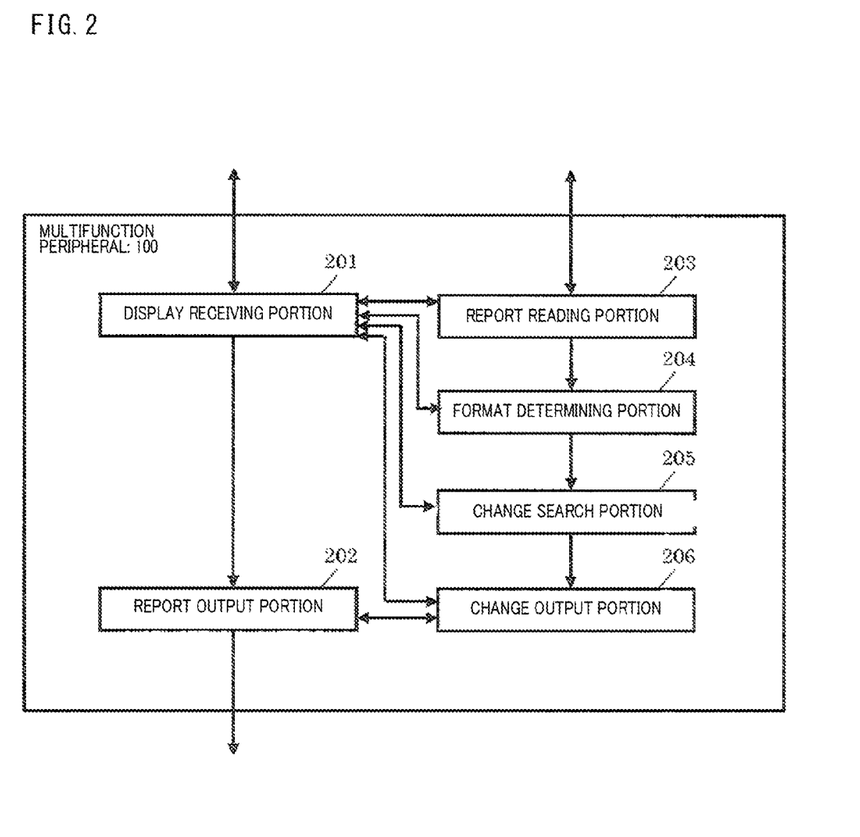
FIG. 2 is a functional block diagram of the multifunction peripheral according to an embodiment of the present disclosure.

Next, the configuration and execution procedure of the embodiment of the present disclosure are described with reference to FIG. 2 and FIG. 3. First, when the user powers on the multifunction peripheral 100, the multifunction peripheral 100 is activated, and the display receiving portion 201 displays an operation screen on the touch panel of the operation portion 101.

Figure 3:
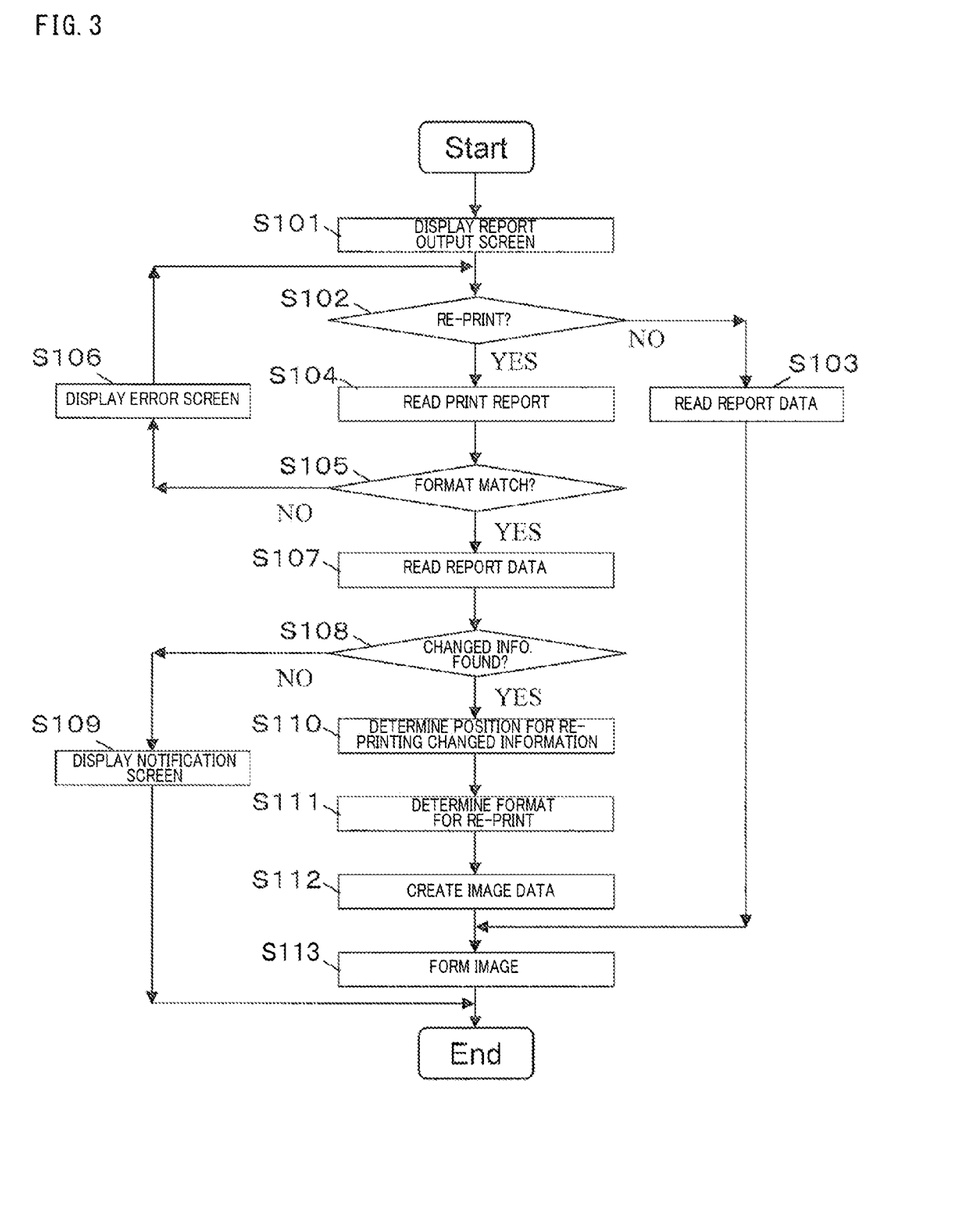
FIG. 3 is a flowchart showing an execution procedure according to an embodiment of the present disclosure.

Here, when the user presses a report output key in a maintenance mode via the touch panel, the display receiving portion 201 displays a report output screen 400 corresponding to the report output key, on the touch panel (FIG. 3: S101).

Figure 4A:
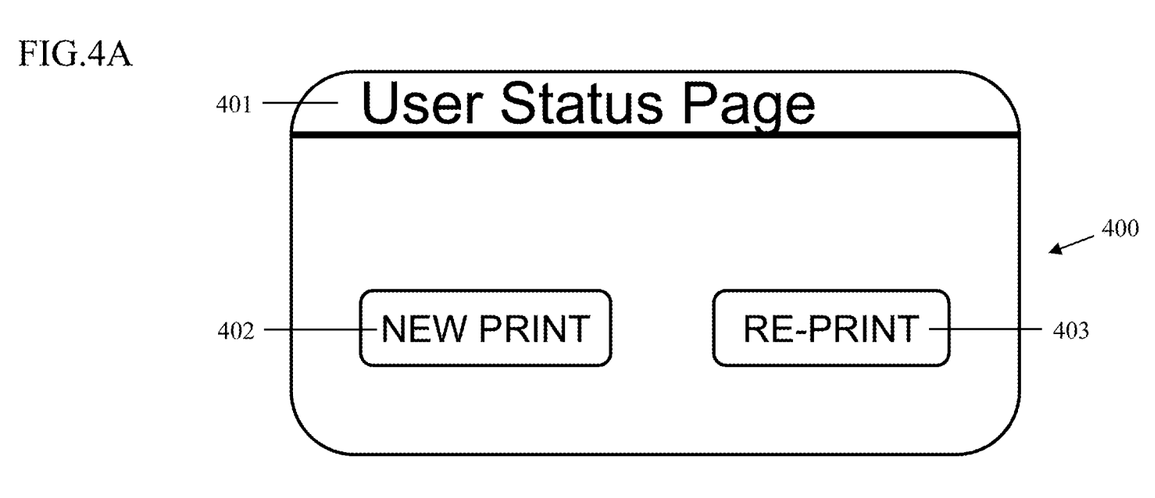
FIG. 4A shows an example of a report output screen in an embodiment of the present disclosure.

As shown in FIG. 4A, on the report output screen 400, a title 401, a new print key 402, and a re-print key 403 are displayed, wherein the title 401 indicates a target to be output as a report (for example, "user status page"), the new print key 402 is used to newly print a report, and the re-print key 403 is used to re-print a report.

When the user selects the new print key 402 on the report output screen 400, the display receiving portion 201 receives the selection of the new print key 402 (FIG. 3: S102 NO), and sends a notification thereof to the report output portion 202. Upon receiving the notification, the report output portion 202 reads report data stored in a predetermined memory (FIG. 3: S103). Subsequently, the report output portion 202 forms an image based on the read report data, and outputs a report (printed material) 404 (FIG. 3: S113).

Figure 4B:
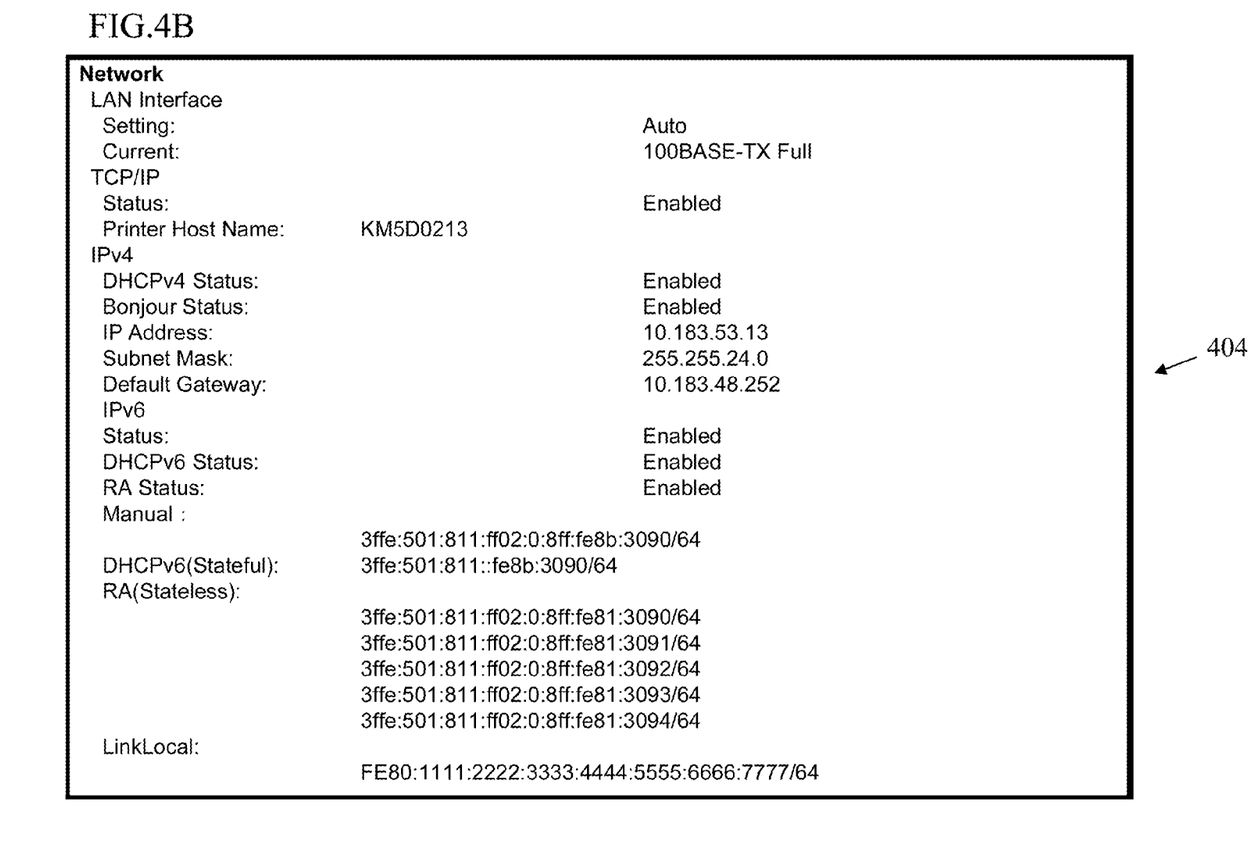
FIG. 4B shows an example of a report in an embodiment of the present disclosure.

As shown in FIG. 4B, the report 404 includes network information and counter information of the multifunction peripheral 100. This allows the user to know the current status of the multifunction peripheral 100.

Meanwhile, the report data reports setting status of various items. While the multifunction peripheral 100 is continuously used, settings in some items may be changed by a manager, a service person or the like. When settings in some items are changed, information in the items of the report data is updated. As a result, the user who manages the report 404 in the form of printed materials needs to confirm whether or not any item in the report data has been changed and what items in the report data have been changed, by causing the multifunction peripheral 100 to output the report on a regular basis.

In S102, when the user selects the re-print key 403, the display receiving portion 201 receives the selection of the re-print key 403 (FIG. 3: S102 YES), and sends a notification thereof to the report reading portion 203. Upon receiving the notification, the report reading portion 203 reads image data of a print report that has already been printed (FIG. 3: S104).

Here, there is no restriction in particular to the method by which the report reading portion 203 reads the data. For example, the report reading portion 203 may display, via the touch panel of the operation portion 101, a guide screen which guides the user to place a print report on the document sheet table or the automatic document sheet feeding portion. This allows the user to, while watching the guide screen, place the print report on the document sheet table and select an image read key on the guide screen. This causes the report reading portion 203 to read image data of the placed print report.

Upon completing the reading, the report reading portion 203 sends a notification thereof to the format determining portion 204. Upon receiving the notification, the format determining portion 204 determines whether or not a format of the print report read by the report reading portion 203 matches a format of the report data of the current time point stored in the memory (FIG. 3: S105).

There is no restriction in particular to the method by which the format determining portion 204 makes the determination on the format. For example, the format determining portion 204 may reference the items (for example, IPv4 and the like) in the report data of the current time point read from the memory, and determine by comparison whether or not the items of the report data of the current time point match the items of the print report whose image data has been read in S104.

When it is determined that the items of the report data of the current time point do not match the items of the print report (FIG. 3: S105 NO), the format determining portion 204 sends a notification thereof to the display receiving portion 201. Upon receiving the notification, the display receiving portion 201 displays an error screen which indicates that the print report is inappropriate, via the touch panel of the operation portion 101 (FIG. 3: S106). This urges the user to detect an appropriate print report from print reports (printed materials) that are owned by the user, and perform the processes again from S102 by using the detected print report.

On the other hand, when it is determined that the items of the report data of the current time point match the items of the print report (FIG. 3: S105 YES), the format determining portion 204 sends a notification thereof to the change search portion 205. Upon receiving the notification, the change search portion 205 searches information (current values) of the item of the report data for changed information (changed part, different part) that is information that has been changed from corresponding information (print value) of the item of the print report.

Figure 5A:
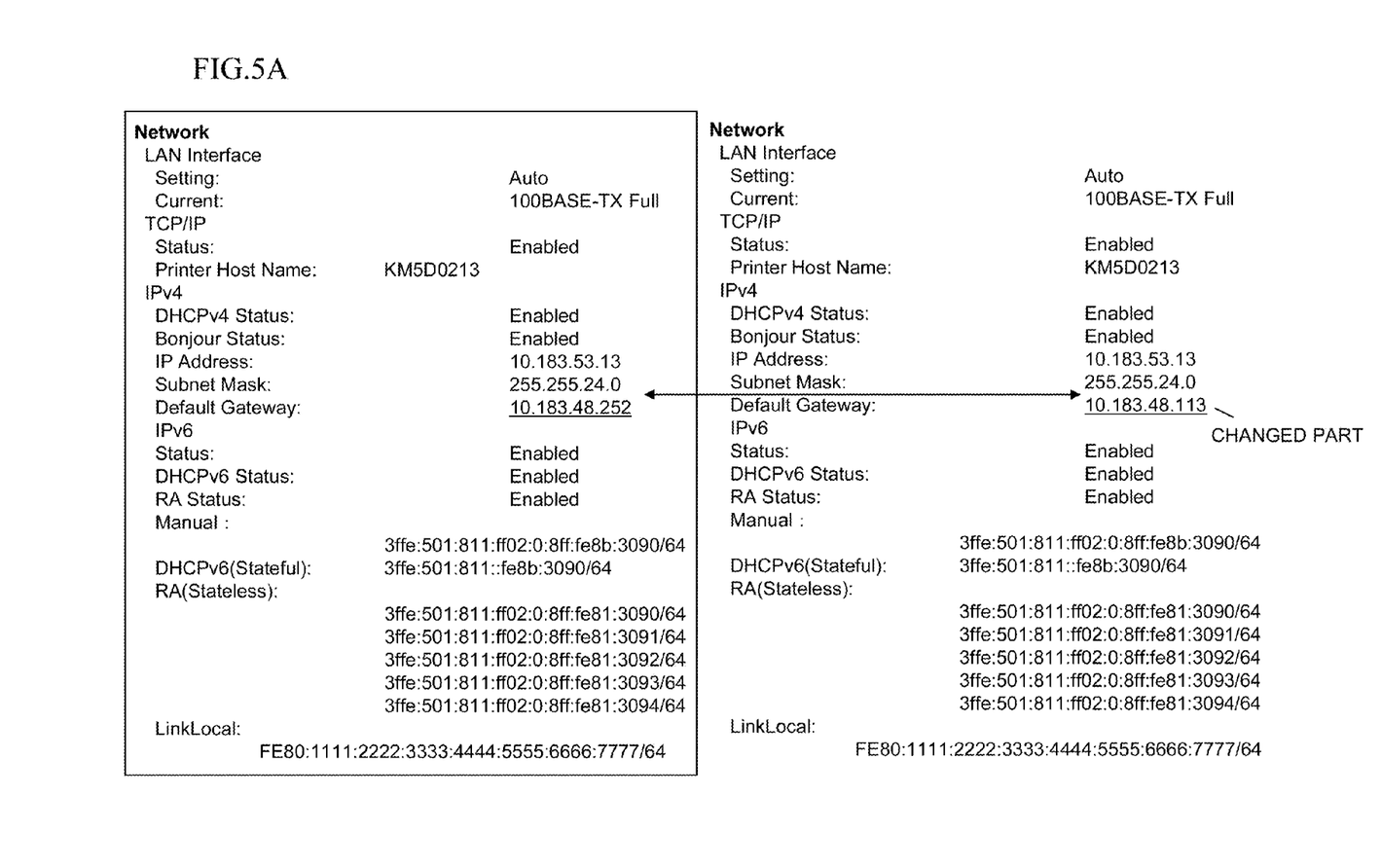
FIG. 5A shows an example of image data of a print report and report data in an embodiment of the present disclosure.

There is no restriction in particular to the method by which the change search portion 205 search for the changed information. For example, as shown in FIG. 5A, the change search portion 205 may read information of each item of the report data from the memory (FIG. 3: S107), and search for information (changed information) of an item of the report data that is different from corresponding information of the item of the print report, by comparing the report data with the print report for each item (FIG. 3: S108). Here, an example of an item in the report data and the print report is "IPv4 Default Gateway", and an example of information of the "IPv4 Default Gateway" is its IP address. It is noted that in FIG. 5A, the IP address of "IPv4 Default Gateway" of the report data is "10.183.48.113", and the IP address of "IPv4 Default Gateway" of the print report is "10.183.48.252".

When no changed information is found in the search (FIG. 3: S108 NO), the change search portion 205 sends a notification thereof to the display receiving portion 201. Upon receiving the notification, the display receiving portion 201 displays a notification screen which indicates that the report data of the current time point is the same as the print report (there is no need to re-print), via the touch panel of the operation portion 101 (FIG. 3: S109). This restricts wasteful consumption of toner for the report.

On the other hand, in S108, when changed information is found in the search (FIG. 3: S108 YES), the change search portion 205 sends a notification thereof to the change output portion 206. Upon receiving the notification, the change output portion 206 re-prints the changed information in the vicinity of the information in the item on the print report that corresponds to the changed information.

Figure 5B:
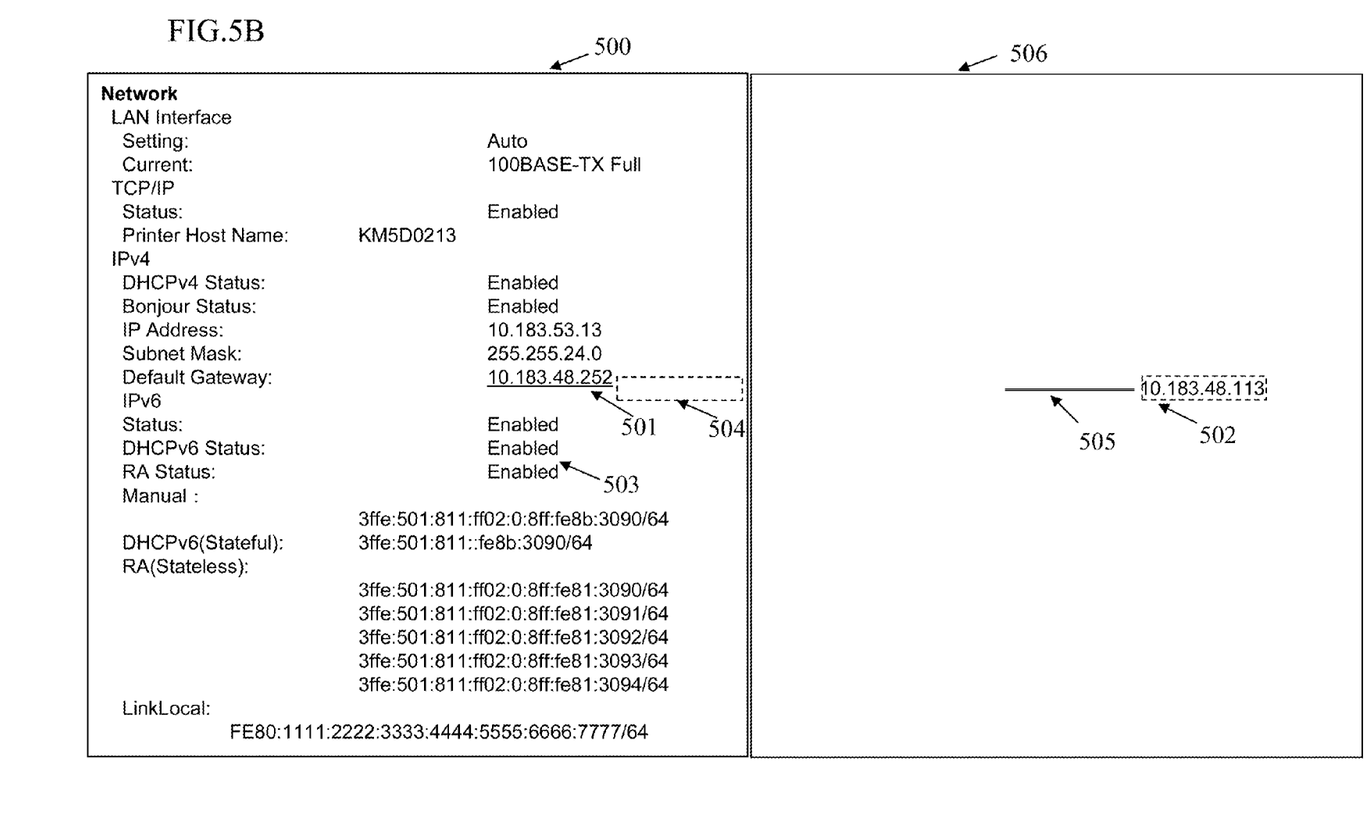
FIG. 5B shows an example of image data of a print report and re-print image data in an embodiment of the present disclosure.

There is no restriction in particular to the method by which the change output portion 206 re-prints the changed information. For example, the change output portion 206 may determine a position at which the changed information can be printed, in a blank area that is closest to the information in the item on the print report (FIG. 3: S110). Specifically, as shown in FIG. 5B, the change output portion 206 determines whether or not there is a space in which changed information 502 can be re-printed, within a predetermined area 504 closest to information 501 in the item of the print report corresponding to the changed information 502, among image data 500 of the print report. In search of the space, the change output portion 206 may, for example, detect a print space for the changed information 502, overlap the detected print space with the predetermined area 504, and determine whether or not the overlapping print space protrudes to an outside of the image data 500. In addition, the change output portion 206 may determine whether or not the overlapping print space further overlap with information 503 of another item of the print report (whether or not the overlapping print space is a blank area).

Upon determining that the print space does not protrude to an outside of the image data 500 and does not overlap with the information 503 of another item of the print report, the change output portion 206 determines the predetermined area 504 as the position at which the changed information is re-printed. On the other hand, upon determining that the print space protrudes to an outside of the image data 500 or overlaps with the information 503 of another item of the print report, the change output portion 206 detects another predetermined area, and performs the above-described processes on the detected other predetermined area. It is noted that, for example, the change output portion 206 may change the predetermined area in sequence among an area on the left, an area below, an area above, and an area on the right of the information 501 in the item of the print report. This makes it possible to detect, in a reliable manner, the position at which the changed information is to be re-printed. In addition, with the changed information re-printed in a vicinity of the corresponding information, the user can recognize the changed information at a glance.

After completing the determination, the change output portion 206 determines the format in which the changed information is to be re-printed (FIG. 3: S111). For example, as shown in the right side of FIG. 5B, the change output portion 206 determines that the changed information 502 is printed in red, and adopts a double line 505 as information that indicates elimination.

The change output portion 206 creates re-print image data for re-print, based on the changed information, the determined position for the re-print, and the format (FIG. 3: S112). Here, as shown in the right side of FIG. 5B, re-print image data 506 created by the change output portion 206 has an extremely small print amount. With this configuration, even when a report is re-printed, only a small amount of toner is consumed, and it is possible to prevent a wasteful amount of toner from being consumed.

Figure 6A:
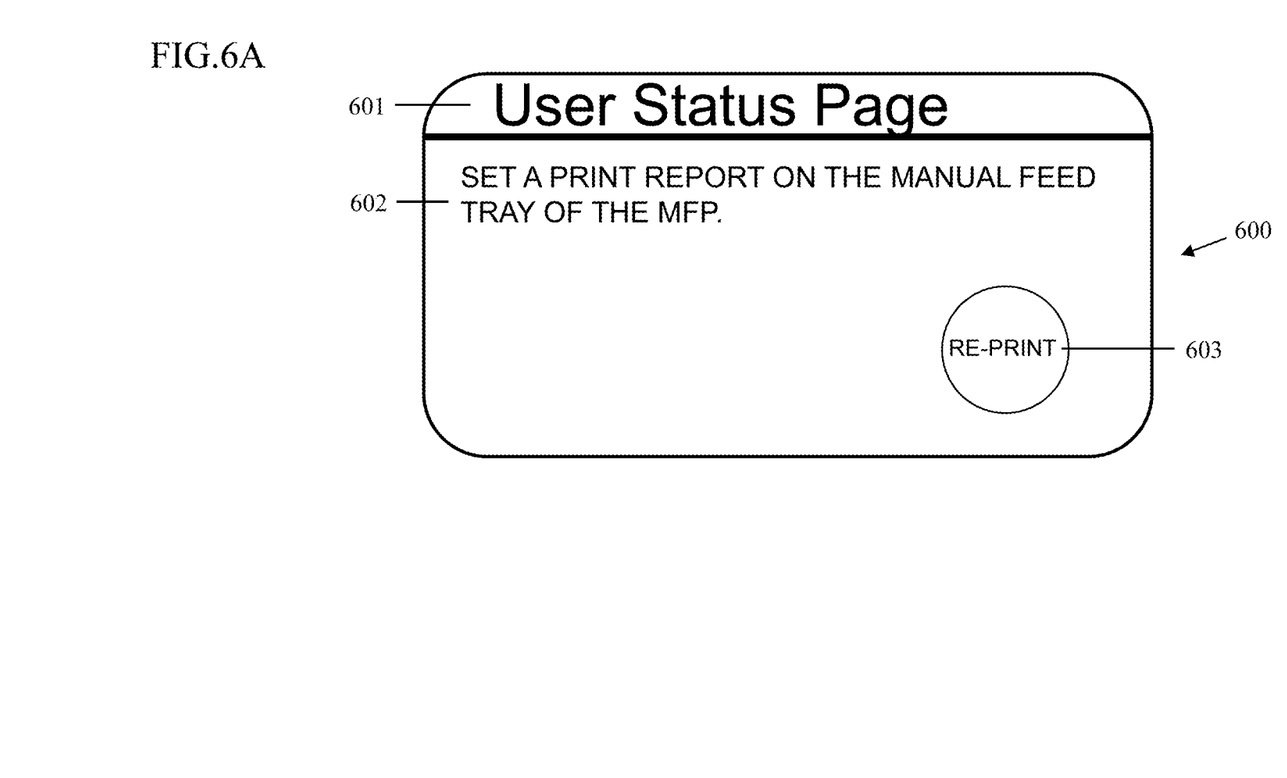
FIG. 6A shows an example of a placement screen in an embodiment of the present disclosure.

After completing the creation of the re-print image data, the change output portion 206 displays, via the touch panel of the operation portion 101, a placement screen 600 that urges the user to place the print report on, for example, the manual feed tray.

As shown in FIG. 6A, a title 601 (for example, "user status page"), a message 602, and a re-print key 603 are displayed on the placement screen 600, wherein the message 602 urges the user to set the print report on the manual feed tray.

When the user, while watching the placement screen 600, places a print report on the manual feed tray, and selects the re-print key 603, the change output portion 206 conveys the print report on the manual feed tray. Subsequently, the change output portion 206 executes a re-print by forming a toner image of the re-print image data on the print report that has been conveyed via the report output portion 202 (FIG. 3: S113).

Figure 6B:
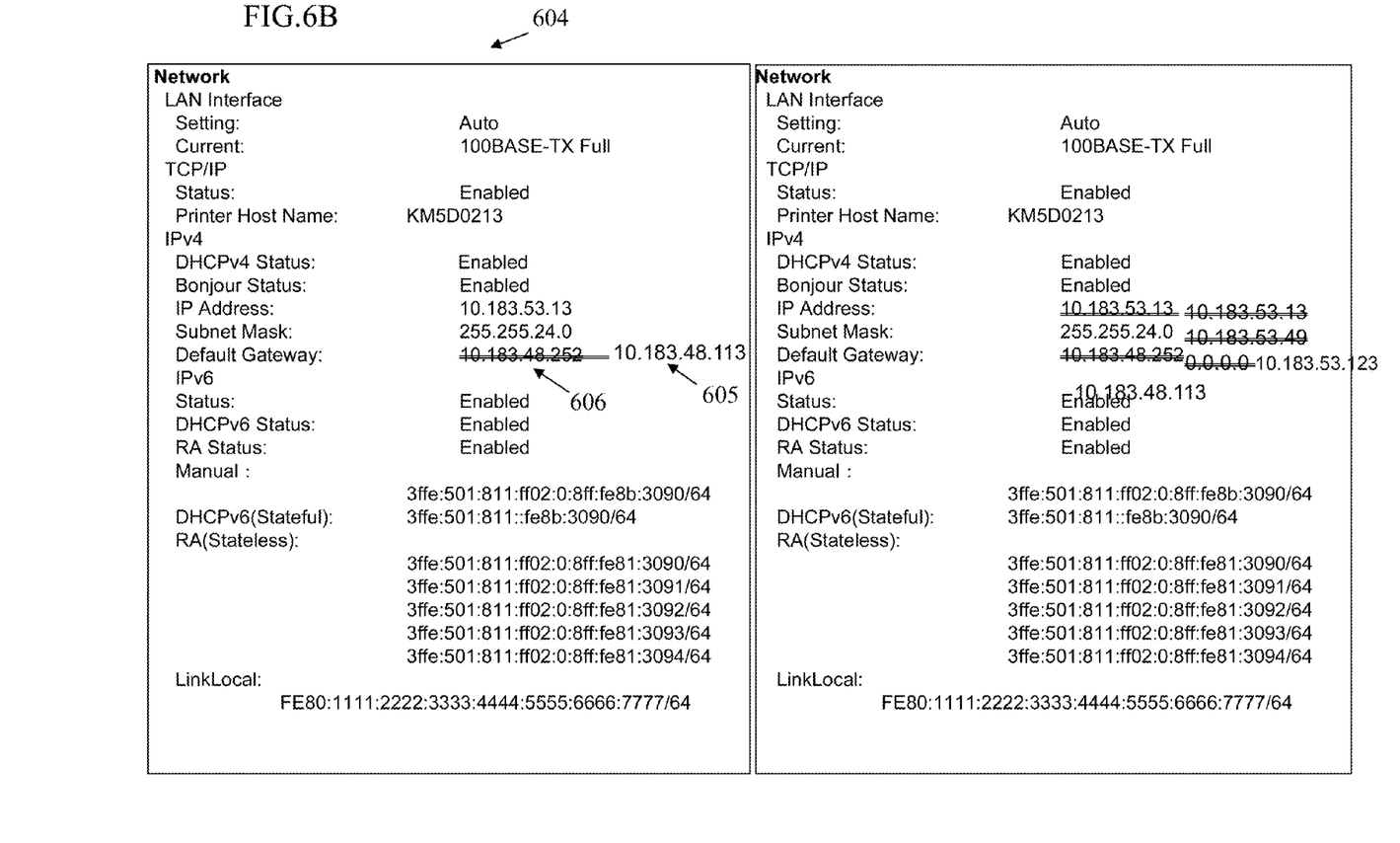
FIG. 6B shows an example of a re-printed print report and a repeatedly re-printed print report in an embodiment of the present disclosure.

As shown in the left side of FIG. 6B, changed information 605 and a double line 606 are re-printed at an appropriate position on the print report (a print report 604). This allows the user to reuse the print report and restrict a wasteful use of paper sheets. In this way, it is possible to minimize the amount of toner and paper sheets to be used. In addition, it becomes easy for the user to visually recognize how information in an item of a print report has changed.

It is noted that when the above-described re-print is repeated, as shown in the right side of FIG. 6B, a double line is further re-printed on the re-printed changed information on the print report, and new changed information is re-printed in the vicinity of the information in the item of the print report corresponding to this changed information. In this way, it is possible to use repeatedly a report that has been printed once.

It is noted that in the embodiment of the present disclosure, the multifunction peripheral 100 includes the portions 201-206. However, programs for realizing the portions 201-206 may be stored in a storage medium, and the storage medium may be provided. With this configuration, the programs are read into the image forming apparatus, and the image forming apparatus realizes the portions. In that case, the programs read from the storage medium produce the acts and effects of the present disclosure. Furthermore, the present disclosure may be provided as a method for storing the steps that are executed by the portions, onto a hard disk.

As described above, the image forming apparatus and the image forming method of the present disclosure are useful for a copier, a printer and the like, as well as for a multifunction peripheral, and are effective as an image forming apparatus and an image forming method that, in a report printing, restrict wasteful consumption of toner and paper sheets, and allow changed information to be recognized easily.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An image forming apparatus comprising:
a display receiving portion configured to display a new print key and a re-print key on a report output screen for selection by a user, and receive a selection of the new print key or the re-print key, the new print key being used to newly print a report, the re-print key being used to re-print a report;
a report reading portion configured to, upon selection of the re-print key, read image data of a print report that has been printed upon selection of the new print key;
a memory storing report data of a current time point;
a format determining portion configured to determine whether or not the print report read by the report reading portion and the report data stored in the memory match in format;
a change search portion configured to, when the format determining portion determines that the print report and the report data match in format, determine whether or not changed information is included in the report data by comparing the report data with the print report for each item, the changed information being information that has been changed from corresponding information in the print report; and
a change output portion configured to, when the change search portion determines that the changed information is included in the report data, determine a position at which the changed information can be printed, in a blank area that is closest to the pre-change information on the print report, create re-print data by adding information indicating elimination to the pre-change information on the print report, and print the re-print data on the print report, wherein
when the change search portion determines that the changed information is not included in the report data, the display receiving portion displays a notification screen which indicates that the report data is the same as the print report.

2. An image forming method comprising:
a display receiving step of displaying a new print key and a re-print key on a report output screen for selection by a user, and receive a selection of the new print key or the re-print key, the new print key being used to newly print a report, the re-print key being used to re-print a report;
a report reading step of, upon selection of the re-print key, reading image data of a print report that has been printed upon selection of the new print key;
a format determining step of determining whether or not the print report read in the report reading step and report data read from a memory that stores report data of a current time point, match in format;
a change search step of, when the format determining step determines that the print report and the report data match in format, determining whether or not changed information is included in the report data by comparing the report data with the print report for each item, the changed information being information that has been changed from corresponding information of the print report; and
a change output step of, when the change search step determines that the changed information is included in the report data, determining a position at which the changed information can be printed, in a blank area that is closest to the pre-change information on the print report, creating re-print data by adding information indicating elimination to the pre-change information on the print report, and printing the re-print data on the print report, wherein
when the change search step determines that the changed information is not included in the report data, the display receiving step displays a notification screen which indicates that the report data is the same as the print report.

* * * * *